US008407995B2

(12) United States Patent
Cho et al.

(10) Patent No.: US 8,407,995 B2
(45) Date of Patent: Apr. 2, 2013

(54) VEHICLE PROVIDED WITH TORQUE DAMPER

(75) Inventors: Masaki Cho, Saitama (JP); Masahiko Nakatsuka, Saitama (JP); Norihiko Sasaki, Saitama (JP); Takanori Osuka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1060 days.

(21) Appl. No.: 12/388,087

(22) Filed: Feb. 18, 2009

(65) Prior Publication Data

US 2009/0205919 A1    Aug. 20, 2009

(30) Foreign Application Priority Data

Feb. 20, 2008   (JP) ................................. 2008-039405

(51) Int. Cl.
*B60K 17/06* (2006.01)
*F16H 35/10* (2006.01)
(52) U.S. Cl. .......................... 60/469; 464/64.1; 464/161
(58) Field of Classification Search .................... 60/469, 60/487; 464/64.1, 161
See application file for complete search history.

(56) References Cited

U.S. PATENT DOCUMENTS

| 4,685,428 | A  | * | 8/1987  | Inagaki et al. ............... 123/52.1 |
| 6,715,379 | B2 |   | 4/2004  | Miguchi et al. |
| 6,832,590 | B2 | * | 12/2004 | Hattori et al. ............. 123/195 R |
| 7,152,403 | B2 | * | 12/2006 | Yoshida .......................... 60/487 |
| 7,594,397 | B2 | * | 9/2009  | Mitsubori et al. ............... 60/488 |

FOREIGN PATENT DOCUMENTS

| JP | 58-191680 A   | 11/1983 |
| JP | 2003-193855 A | 7/2003  |
| JP | 2005-248838 A | 9/2005  |
| JP | 2005-263143 A | 9/2005  |

* cited by examiner

*Primary Examiner* — Thomas E Lazo
(74) *Attorney, Agent, or Firm* — Birch, Stewart, Kolasch & Birch, LLP

(57) ABSTRACT

A torque shock or vibrations caused by the rotary inertia of a hydrostatic continuously variable transmission is reduced to improve ride quality of a vehicle when excessive torque occurs in a torque transmission path between a crankshaft and a drive wheel. A motorcycle includes a hydrostatic continuously variable transmission rotatably driven by torque of a crankshaft of an internal combustion engine. A rear wheel is rotatably driven by torque from the transmission. A torque damper absorbs excessive torque occurring in a torque transmission path from the crankshaft to the rear wheel. The torque dampers include an input side torque damper disposed in an input side torque transmission path between the crank shaft and the transmission and an output side torque damper disposed in an output side torque transmission path between the transmission and the rear wheel.

2 Claims, 4 Drawing Sheets

VEHICLE PROVIDED WITH TORQUE DAMPER

CROSS-REFERENCE TO RELATED APPLICATIONS

This nonprovisional application claims priority under 35 U.S.C. §119(a) on Patent Application No. 2008-039405, filed in Japan on Feb. 20, 2008, the entirety of which is incorporated herein by reference.

BACKGROUND OF THE INVENTION

1. Field of the Invention:

The present invention relates to a vehicle including an internal combustion engine, a hydrostatic continuously variable transmission adapted to receive torque caused by the engine, and a torque damper adapted to absorb excessive torque occurring in a torque transmission path between a crankshaft of the engine and a drive wheel.

2. Background of the Invention:

A vehicle is known that is provided with a drive wheel rotatably driven by the torque of the crankshaft of an internal combustion engine and with a torque damper adapted to absorb excessive torque occurring in the torque transmission path between the crankshaft and the drive wheel (see, e.g. Japanese Patent Laid-open No. 2003-193855 and Japanese Patent Laid-open No. Sho 58-191680).

In addition, there is known a vehicle provided with an internal combustion engine and with a transmission that is composed of a swash plate type hydrostatic continuously variable transmission (see, e.g. Japanese Patent Laid-open No. 2005-248838 and Japanese Patent Laid-open No. 2005-263143).

SUMMARY OF THE INVENTION

In a vehicle provided with an internal combustion engine and with a hydrostatic continuously variable transmission, the hydrostatic continuously variable transmission is a component with a large rotary inertia. Thus, if excessive torque occurs in the torque transmission path between a crankshaft and a drive wheel, such as when engine-braking is applied, a large torque shock may occur due to the rotary inertia of the transmission. Otherwise, the transmission and the crankshaft may be liable to cause resonance. Thus, the resonance may cause vibrations, which results in degraded ride quality of a vehicle.

In view of such situations, the present invention has been made. It is an object of the present invention to reduce a torque shock or vibrations caused by the rotary inertia of a hydrostatic continuously variable transmission to improve ride quality of a vehicle, when excessive torque occurs in the torque transmission path between a crankshaft and a drive wheel. In addition, it is an object of the present invention to downsize an input side torque damper.

A first aspect of the present invention is directed to a vehicle (V) including: an internal combustion engine (E) provided with a crankshaft (33); a hydrostatic continuously variable transmission (60) rotatably driven by torque of the crankshaft (33); a drive wheel (7) rotatably driven by torque from the transmission (60); a torque damper (54, 100) for absorbing excessive torque occurring in a torque transmission path from the crankshaft (33) to the drive wheel (7). The torque transmission path is composed of an input side transmission path between the crankshaft (33) and the transmission (60) and an output side torque transmission path between the transmission (60) and the drive wheel (7), with the transmission (60) interposed therebetween. The torque damper (54, 100) includes an input side torque damper (54) disposed in the input side torque transmission path and an output side torque damper (100) disposed in the output side torque transmission path.

According to a second aspect of the present invention, the output side torque transmission path includes a transmission mechanism (T) including a first rotating shaft (72) adapted to receive torque from an transmission output shaft (64) of the transmission (60) and a second rotating shaft (90) adapted to receive torque from the first rotating shaft (72); and a terminal transmission mechanism (140) adapted to receive torque from the transmission mechanism (T) for driving the drive wheel (7), and in the output side torque transmission path, a rotating shaft disposed between the transmission output shaft (64) and the second rotating shaft (90) is only the single first rotating shaft (72); and the output side torque damper (100) is mounted to the second rotating shaft (90).

According to a third aspect of the present invention, the output side torque damper (100) has capacity greater than that of the input side torque damper (54).

According to the first aspect of the present invention, in the torque transmission path from the crankshaft of the internal combustion engine through the hydrostatic continuously variable transmission to the drive wheel, the input side torque damper and the output side torque damper are disposed in the input side torque transmission path and the output side torque transmission path, respectively, with the transmission interposed therebetween. Excessive torque occurring in the torque transmission path is absorbed by the output side torque damper and then is applied to the transmission. Thus, the excessive torque applied to the transmission, excessive torque occurring in the input side torque transmission path, and vibrations caused when the transmission and the crankshaft resonate with each other are reduced. Consequently, a torque shock or vibrations caused by rotary inertia of the transmission is reduced to improve ride quality of the motorcycle.

According to the second aspect of the present invention, in the output side torque transmission path, a rotating shaft to which the excessive torque reduced by the output side torque damper is applied is only the single first rotating shaft between the transmission and the output side torque damper. Thus, the rotary inertia of the rotating shaft disposed between the output side torque damper and the transmission can be reduced. Consequently, the torque shock caused by the excessive torque in the input side torque transmission path and additionally the capacity of the input side torque damper can be reduced to downsize the input side torque damper.

According to the third aspect of the present invention, the excessive torque in the output side torque transmission path is largely absorbed by the output side torque damper. Therefore, the torque shock caused by the rotary inertia of the transmission can significantly be reduced. Consequently, the torque shock is further reduced and the capacity of the input side torque damper is small, which can downsize the input side torque damper.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
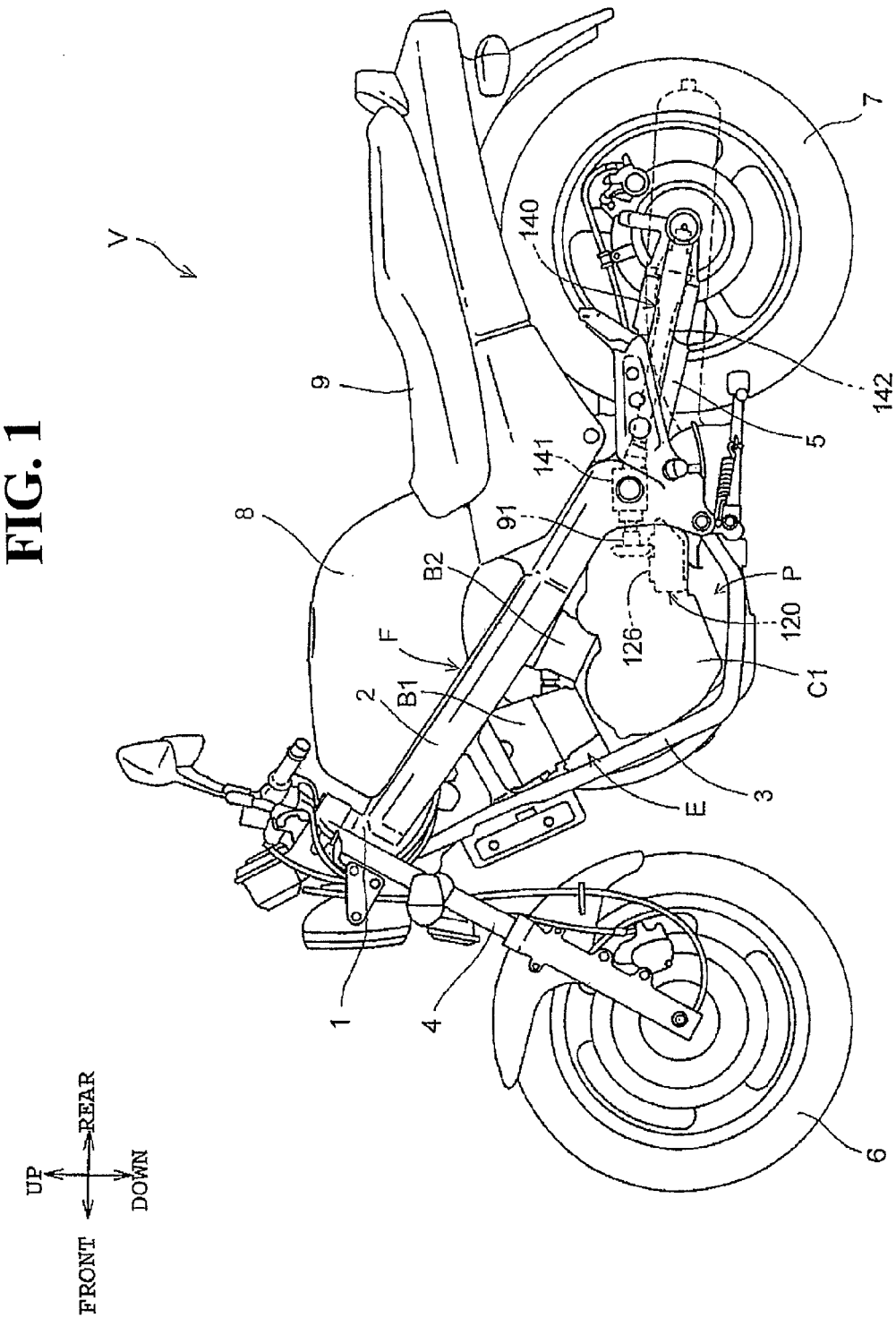
FIG. 1 is a left lateral view illustrating a major portion of a motorcycle provided with a sound insulation structure embodying the present invention.

The present invention will now be described in detail with reference to the accompanying drawings, wherein the same reference numerals will be used to identify the same or similar elements throughout the several views. Preferred embodiments of the present invention will hereinafter be described with reference to FIGS. 1 through 4.

Referring to FIG. 1, in an embodiment, a vehicle embodying the present invention is a motorcycle V provided with a power unit P.

It is to be noted that in the embodiment a left and right direction and a back and forth direction correspond to the left and right direction and back and forth direction, respectively, of the motorcycle V mounted with the power unit P thereon and an up-and-down direction is a vertical direction.

An axial direction is a direction of a rotational centerline with respect to each of rotational axes described later. An axial direction of a crankshaft 33 (see FIG. 3) included in an internal combustion engine E corresponds to the left and right direction in the embodiment. If one of the right and left is one direction of the axial directions of the crankshaft 33, the other of the right and left is the other direction of the axial directions of the crankshaft 33.

The motorcycle V includes a body frame F including a head pipe 1, a main frame 2 and a down tube 3. The power unit P is carried by the body frame F. A front wheel 6 is rotatably supported by a front fork 4 steerably supported by the head pipe 1. A rear wheel 7 is rotatably supported by a swing arm 5 swingably supported by the main frame 2. A fuel tank 8 and an occupant seat 9 are carried by the body frame F. The power unit P is disposed below the occupant seat 9 in the motorcycle V.

Figure 2:
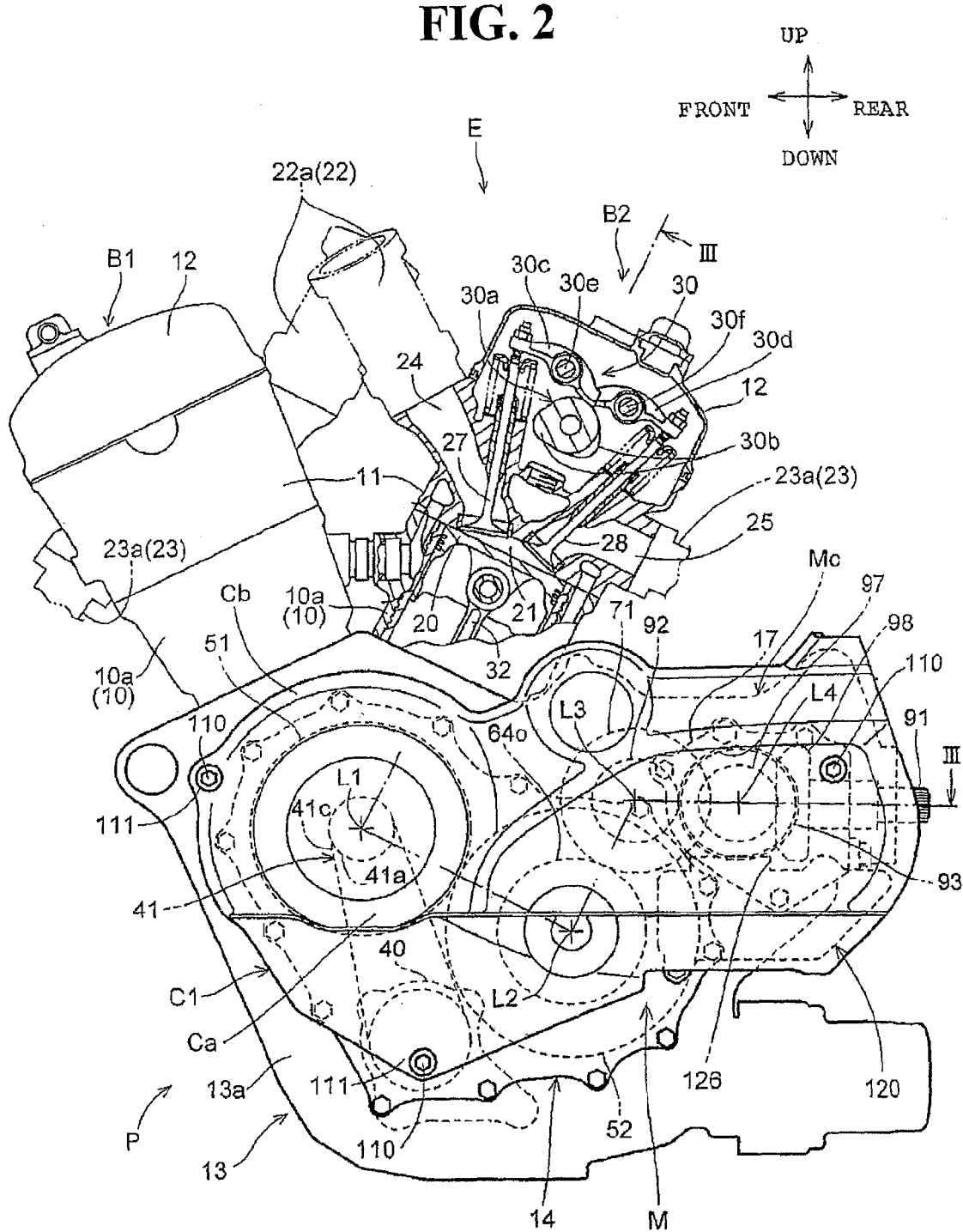
FIG. 2 is a lateral view illustrating a major portion of a power unit provided for the motorcycle of FIG. 1.
Figure 3:
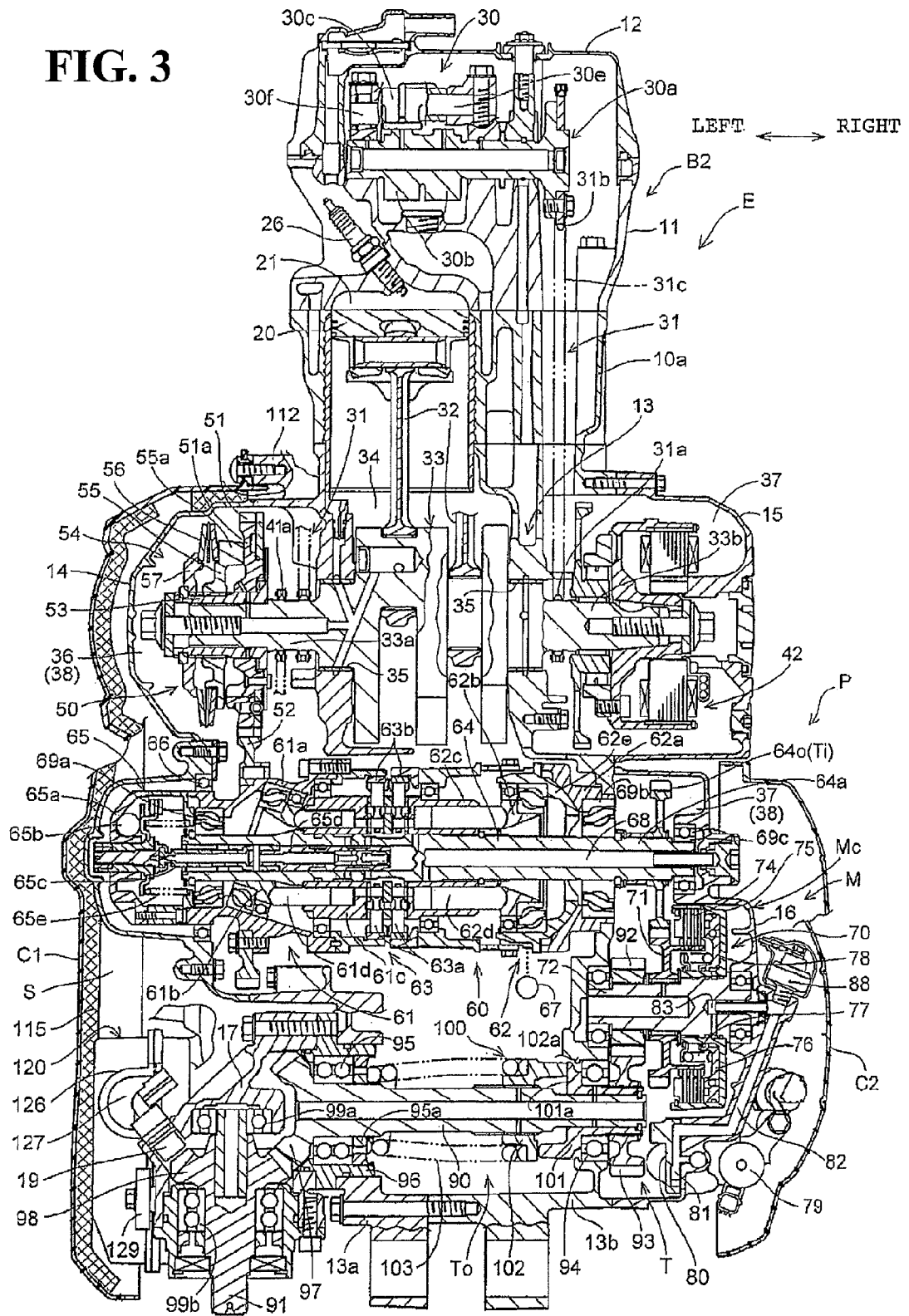
FIG. 3 is a cross-sectional view of FIG. 2 taken along line III-III of FIG. 2.

With additional reference to FIGS. 2 and 3, the power unit P includes an internal combustion engine E, which is a water-cooled multi-cylinder 4-stroke internal combustion engine. A transmission apparatus M including a transmission 60 (see FIG. 3) is adapted to receive power from the crankshaft 33. In addition, the power unit P is such that the internal combustion engine E is integrally joined to the transmission apparatus M and outputs power used to drive the rear wheel 7 as a drive target.

The internal combustion engine E carried by the body frame F in a transverse-mounted arrangement where the crankshaft 33 is oriented in a vehicle-width direction is a V-type internal combustion engine having a front bank B1 and a rear bank B2. The transmission 60 is a hydrostatic continuously variable transmission including a hydraulic pump 61 and a hydraulic motor 62.

The power produced by the internal combustion engine E is received by the transmission apparatus M and then transmitted through a power takeout shaft 91 of the transmission apparatus M, and through a terminal transmission mechanism 140 to the rear wheel 7 as the drive wheel. The terminal transmission mechanism 140 is connected to the power take-out shaft 91 via a universal joint 141 and includes a drive shaft 142 housed in a swing arm 5.

The internal combustion engine E includes an engine main body configured to include a cylinder block 10 having a plurality of, two in the embodiment, cylinders 10a arranged to form a pair of V-shaped banks B1, B2. In addition, the engine main body includes a pair of cylinder heads 11 joined to the corresponding upper ends of cylinders 10a included in the respective banks B1, B2. Furthermore, the engine main body includes a pair of cylinder head covers 12 joined to the corresponding upper ends of the cylinder heads 11; and a crankcase 13 joined to the lower end of the cylinder block 10.

The respective structures of the cylinders 10a, the cylinder heads 11 and the cylinder head covers 12 in the banks B1, B2 are basically the same in both the banks B1, B2. Therefore, such structures are hereinafter described with main reference to the structure of the rear bank B2.

With reference to FIGS. 2 and 3, the cylinder head 11 includes a combustion chamber 21, an intake port 24, an exhaust port 25, an ignition plug 26, an intake valve 27 and an exhaust valve 28. The combustion chamber 21 faces a piston 20 in a cylinder axial direction. The intake port 24 is adapted to lead an air-fuel mixture into the combustion chamber 21. The air-fuel mixture is composed of intake air from an air intake device 22 and fuel from a fuel injector (not shown). The air intake device 22 has a throttle body 22a connected to the cylinder head 11. The exhaust port 25 is adapted to lead exhaust gas from the combustion chamber 21 to the exhaust device 23 having an exhaust pipe 23a connected to the cylinder head 11. The ignition plug 26 faces the combustion chamber 21. The intake valve 27 and the exhaust valve 28 are adapted to open and close the intake port 24 and the exhaust port 25, respectively.

A valve train 30 for opening and closing the intake valve 27 and the exhaust valve 28 includes a cam shaft 30a with a valve-operating cam 30b. Rocker arms 30c and 30d are in contact with the intake valve 27 and the exhaust valve 28, respectively, and are driven to swing by the valve-operating cam 30b. The valve-operating cam 30b is adapted to open and close the intake valve 27 and the exhaust valve 28 via the rocker arms 30c and 30d swingably supported by the rocker shafts 30e and 30f, respectively.

A valve-operating transmission mechanism 31 in which the cam shaft 30a is rotatably driven by torque of the crankshaft 33 includes a drive sprocket 31a attached to both shaft-end portions 33a, 33b of the crankshaft 33. A cam sprocket 31 is attached to the camshaft 30a. A chain 31c is wound around both the sprockets 31a, 31b.

The crankcase 13 is a left-right-split crankcase formed by joining together a pair of case half-bodies 13a, 13b which are a plurality of vehicle-widthwise (also of left-right directionally) split case portions. The crankshaft 33 connected to each piston 20 via a connecting rod 32 is housed in a crank chamber 34 defined by the crankcase 13 and rotatably supported by both the case half-bodies 13a, 13b via a pair of respective main bearings 35. The crankcase 13 partially forms a transmission case Mc of the transmission apparatus M.

The internal combustion engine E includes a pair of covers 14 and 15 fastened respectively to the left and right case half bodies 13a and 13b with a large number of bolts.

One shaft-end portion 33a of the crankshaft 33 extending leftward from the inside of the crank chamber 34 extends into a transmission chamber 36 which is a left chamber defined by the left case half body 13a and the left cover 14. The other shaft-end portion 33b projecting rightward from the inside of the crankshaft 34 extends into an auxiliary machinery chamber 37 which is a right chamber defined by the right case half body 13b and the right cover 15. An input side transmission mechanism 50 of the transmission apparatus M and a drive sprocket 41a are mounted to the shaft-end portion 33a. A chain 41c of the transmission mechanism 41 for driving an oil pump 40 is wound around the drive sprocket 41a. In addition, an alternator 42 is mounted to the shaft-end portion 33b. The transmission apparatus M, the oil pump 40 and the alternator 42 are driven units each driven by torque of the crankshaft 33.

The transmission apparatus M includes the transmission 60 rotatably driven by torque of the crankshaft 33. The input side transmission mechanism 50 is adapted to transfer torque of the crankshaft 33 to the transmission 60. An output side transmission mechanism T receives the torque outputted from the transmission 60. The transmission case Mc defines a transmission chamber 38 for housing the transmission 60 and both the transmission mechanisms 50, T.

Torque (or power) produced by the internal combustion engine E is transmitted from the crankshaft 33 or an engine output shaft to the rear wheel 7 (see FIG. 1) via a torque transmission path formed by the input side transmission mechanism 50, the transmission 60, the output side transmission mechanism T and the terminal transmission mechanism 140 (see FIG. 1). This torque transmission path is composed of an input side torque transmission path between the crankshaft 33 and the transmission 60, the transmission 60 itself, and the output side torque transmission path between the transmission 60 and the rear wheel 7, with the transmission 60 interposed therebetween. In this way, the input side torque transmission path is formed of the input side transmission mechanism 50 and the output side torque transmission path is formed of the output side transmission mechanism T and the terminal transmission mechanism 140 adapted to receive torque from the output side transmission mechanism T.

The transmission case Mc includes the pair of case half bodies 13a, 13b; a left cover 14 also serving as a left transmission cover. A right cover 16 is a right transmission cover joined to the right case half body 13b. A gear cover 17 is a cover joined to the rear portion of the left case half body 13a along with a bearing housing 96. Of the first and second transmission chambers 36, 37 forming the transmission chamber 38, the first transmission chamber 36 in which the transmission 60, the input side transmission mechanism 50 and a major portion of the output side transmission mechanism T excluding a portion such as a running clutch 70 and the like are arranged is formed of both the case half bodies 13a, 13b and the left cover 14. The second transmission chamber 37 as a clutch chamber in which the running clutch 70 is arranged is formed of the right case half body 13b and the right cover 16.

The crankcase 13, the left cover 14, both the right covers 15, 16 and the gear cover 17 constitute a power case of the power unit P.

The input side transmission mechanism 50 includes a gear mechanism 51, 52 adapted to transmit torque of the crankshaft 33 to the transmission 60. An input side torque damper 54 absorbs excessive torque produced in the input side torque transmission path.

The gear mechanism 51, 52 includes a drive gear 51 and a driven gear 52. The drive gear 51 is joined to the crankshaft 33 via a transmission mechanism including a collar 53 spline-fitted to the shaft-end portion 33a and an input cam member 55 spline-fitted to the collar 53. The driven gear 52 is provided to rotate integrally with a pump housing 61a as an input rotating body of the transmission 60. The driving gear 51 is rotatably carried on the collar 53 and is mounted to the shaft-end portion 33a via the collar 53.

The torque damper 54 of cam type includes an input cam member 55 as an input member. A drive gear 51 is an output cam member as an output member. A damper spring 51 is provided as a biasing member. The input cam member 55 is axially movable with respect to the shaft-end portion 33a. The drive gear 51 is engaged with the input cam member 55 so as to receive torque of the crankshaft 33 via the input cam member 55. The damper spring 56 axially biases the input cam member 55 to bring it into abutment against the drive gear 51. The damper spring 56 composed of a plurality of disc springs is disposed between a spring receiver 57 held by the collar 53 and the input cam member 55. The input cam member 55 has an input cam portion 55a and the drive gear 51 has an output cam portion 51a. The input cam portion 55a and the output cam portion 51a are brought into axial and circumferential abutment against each other by the biasing force of the damper spring 56 and can circumferentially and relatively be slid.

The torque damper 54 integrally rotates the input cam member 55 and the drive gear 51 when torque not greater than a predetermined first set torque is applied between the input cam member 55 and the drive gear 51. During deceleration of the motorcycle (see FIG. 1) or of the internal combustion engine E, or during engine-braking of the motorcycle V, application of excessive torque exceeding the first set torque causes circumferential slip between the input cam member 55 and the drive gear 51. Thus, the input cam member 55 and the drive gear 51 are relatively rotated while the input cam member 55 driven by the output cam portion 51a is axially moved against the biasing force of the damper spring 56, thereby absorbing the excessive torque.

The transmission 60 is the same as that disclosed in the above-mentioned Japanese Patent Laid-open Nos. 2005-248838 or 2005-263143 and includes a swash plate type hydraulic pump 61; a swash plate type hydraulic motor 62; a valve mechanism 63 for controlling flow of hydraulic oil between the hydraulic pump 61 and the hydraulic motor 62; a transmission output shaft 64 as an output rotating body; and an input side clutch 65 as a start clutch for switching stoppage and rotation of the transmission output shaft 64.

The hydraulic pump 61 includes a pump housing 61a rotatably carried by the left cover 14 via a bearing 66. A pump swash plate 61b is housed in the pump housing 61a. A pump body 61c is disposed to axially face the pump swash plate 61b. A plurality of pump plungers 61d is fitted to the pump body 61c so as to be able to reciprocate and driven by the pump swash plate 61b to take in and discharge hydraulic oil.

The hydraulic motor 62 includes a motor housing 62a secured to the right case half body 13b. A support member 62e is swingably supported by a spherical support surface formed on the motor housing 62a. A motor swash plate 62b is rotatably supported by the support member 62e. The hydraulic motor 62 further includes a motor body 62c disposed to axially face the motor swash plate 62b. A motor plunger 62d is fitted to the motor body 62c to be able to reciprocate and driven by hydraulic oil discharged from the hydraulic pump 61. An electric motor 67 is provided as an actuator for driving the support member 62e. The support member 62e is driven and swung by the electric motor 67 to change the inclination angle of the motor swash plate 62b. This changes the rotational speed of the transmission output shaft 64 relative to the rotational speed of the crankshaft 33 to thereby change the rotational speed of the crankshaft 33.

The valve mechanism 63 axially interposed between the hydraulic pump 61 and the hydraulic motor 62 includes a plurality of spools 63a and control rings 63b. The spools 63a are adapted to control the flow of hydraulic fluid which is oil discharged by the oil pump 40 and supplied from an oil passage formed in the right cover 16 through an oil passage 68 formed in the transmission output shaft 64 and the flow of hydraulic fluid between the hydraulic pump 61 and the hydraulic motor 62. The control rings 63b control the positions of the spools 63a in accordance with the rotational positions of the spools 61a.

The transmission output shaft 64 spline-fitted to the motor body 62c is rotatably journaled by the pump housing 61a, the motor housing 62a, and the right cover 16 via bearings 69a, 69b, and 69c, respectively. In addition, the transmission output shaft 64 has a rotational centerline L2 parallel to a rotational centerline L1 of the crankshaft. Respective rotational centerlines L3, L4 of an output shaft 72 and of an intermediate shat 90 are parallel to both the centerlines L1, L2.

The clutch 65 disposed at an end of the transmission 60 axially close to the left cover 14 transmits and interrupts torque from the driven gear 52 to the transmission output shaft 64. The clutch 65 includes an input member 65a, a centrifugal weight 65b, an output member 65c, and a clutch spring 65e. The input member 65a is rotated integrally with the pump housing 61a. The centrifugal weight 65b is supported by the input member 65a and guided by the input member 65a so as to be radially movable by centrifugal force produced according to the rotational speed of the input member 65a. The output member 65c is axially movable depending on the position of the centrifugal weight 65b and is rotated integrally with the input member 65a. The clutch spring 65e is disposed between the input member 65a and the output member 65c to press the centrifugal weight 65b to the input member 65a via the output member 65c.

The output member 65c has a spool 65d constituting a spool valve using the transmission output shaft 64 as a sleeve.

When the engine speed of the internal combustion engine E is not higher than idling speed, the clutch 65 is located at a torque interruption position shown in FIG. 3. In this case, the spool 65d allows the hydraulic fluid discharged from the hydraulic pump 61 to return to the hydraulic pump 61 without rotating the hydraulic motor 62. When the engine speed exceeds the idling speed, the spool 65d is driven by the centrifugal weight 65b radially outwardly moved by centrifugal force to move rightward, which allows the clutch 65 to take a torque transmission position. At this transmission position, the hydraulic fluid discharged from the hydraulic pump 61 flows in and rotatably drives the hydraulic motor 62. Thus, the torque of the crankshaft 33 is transmitted to the transmission output shaft 64. In an area where the engine speed exceeds the idling speed, the transmission output shaft 64 is rotated at a rotational speed that is varied depending on the inclination angle of the motor swash plate 62b.

The output side transmission mechanism T includes an input mechanism Ti, the running clutch 70, and an output mechanism To. The input mechanism Ti is composed of an output gear 64o provided on the transmission output shaft 64 so as to rotate integrally therewith. The running clutch 70 serves as an output side clutch to switch between a drive position and a neutral position by transmitting and interrupting torque from the transmission 60 to the rear wheel 7. The output mechanism To is a transmission mechanism which transmits torque transmitted from the transmission 60 via the running clutch 70 to the terminal transmission mechanism 140 (see FIG. 1).

The output gear 64o as an output rotating body is spline-fitted to a shaft-end portion 64a of the transmission output shaft 64 extending rightward from the bearing 69b into the second transmission chamber 37 and is engaged with an input gear 71 of the running clutch 70.

Referring to FIG. 3, the running clutch 70 is a hydraulic multiple-disc friction clutch and includes an output shaft 72 as an output member; an input gear 71 as an input member; a plurality of clutch plates 74; a housing as an intermediate member; a pressing piston 76; and a clutch spring 77. The output shaft 72 is rotatably journaled by the right case half body 13b and by the right cover 16 via bearings. The input gear 71 is rotatably carried by the output shaft 72 so as to receive torque from the transmission output shaft 64 as an input shaft via the output gear 64o. The clutch plates 74 are alternately stacked. The housing 75 is spline-fitted to the output shaft 72 for integral rotation. The pressing piston 76 is fitted to the housing 75 so as to be able to reciprocate and can press the clutch plates 74 and bring them into contact with each other. The housing 75 can transmit torque to the output shaft 72 from the input gear 71 via the clutch 74 in an engagement state. The clutch spring 77 biases the pressing piston 76 to separate the clutch plates 74 from each other.

The running clutch 70 as a hydraulically-operated device operated by hydraulic pressure is formed with a hydraulic chamber 78 defined between the housing 75 and the pressing piston 76 and receiving hydraulic fluid led thereinto, the hydraulic fluid driving the pressing piston 76. The hydraulic fluid is part of oil discharged from the oil pump 40 (see FIG. 2) driven by the transmission mechanism 41.

The hydraulic pressure in the hydraulic chamber 78 is controlled by a hydraulic control device for controlling the supply and discharge of oil to and from the hydraulic chamber 78. The hydraulic control device includes a hydraulic control valve 79 provided on the right cover 16 and controlled by a control device in response to the operation of a shift position control member; and an oil passage line where oil controlled by the hydraulic valve 79 flows.

This oil passage line is a passage adapted to supply and discharge oil to and from the hydraulic chamber 78. The oil passage line includes an oil passage 81 formed in a connection member 80 connected to the hydraulic control valve 79 having part of the right cover 16 as a valve body. An oil passage 82 merges with the oil passage 81 and is formed in the right cover 16. An oil passage 83 is adapted to allow the oil passage 82 to communicate with the hydraulic chamber 78.

A hydraulic sensor 88, which detects the hydraulic pressure of the oil passage line, is attached to the right cover 16 in order to monitor the operating state of the running clutch 70 by detecting the hydraulic state in the running clutch 70. The hydraulic sensor 88 detects the hydraulic pressure of the oil passage 82.

In the running clutch 70 constructed as above, if oil with high hydraulic pressure is supplied to the hydraulic chamber 78 to increase the hydraulic pressure in the hydraulic chamber 78 to a high level, the pressing piston 76 presses the first and second clutch plates 73, 74. Thus, friction between the first and second clutch plates 73, 74 provides an engagement state where the input gear 71 and the output gear 75 are rotated integrally with each other. Consequently, the torque of the transmission output shaft 64 is transmitted to the output shaft 72 via both the gears 64o, 71. On the other hand, if the hydraulic fluid in the hydraulic chamber 78 is discharged to reduce the hydraulic pressure in the hydraulic chamber 78 to a low level, the elastic force of the clutch spring 77 separates both the clutch plates 73, 74 from each other. Thus, a disengagement state is provided where transmission of torque between the input gear 71 and the housing 75 is interrupted. Consequently, the transmission of torque of the transmission output shaft 64 to the output shaft 72 is interrupted. In this way, control is exercised to supply and discharge oil to and from the hydraulic chamber 78 via the oil passages 81, 82, and 83 to control the disengagement and engagement of the running clutch 70.

Figure 4:
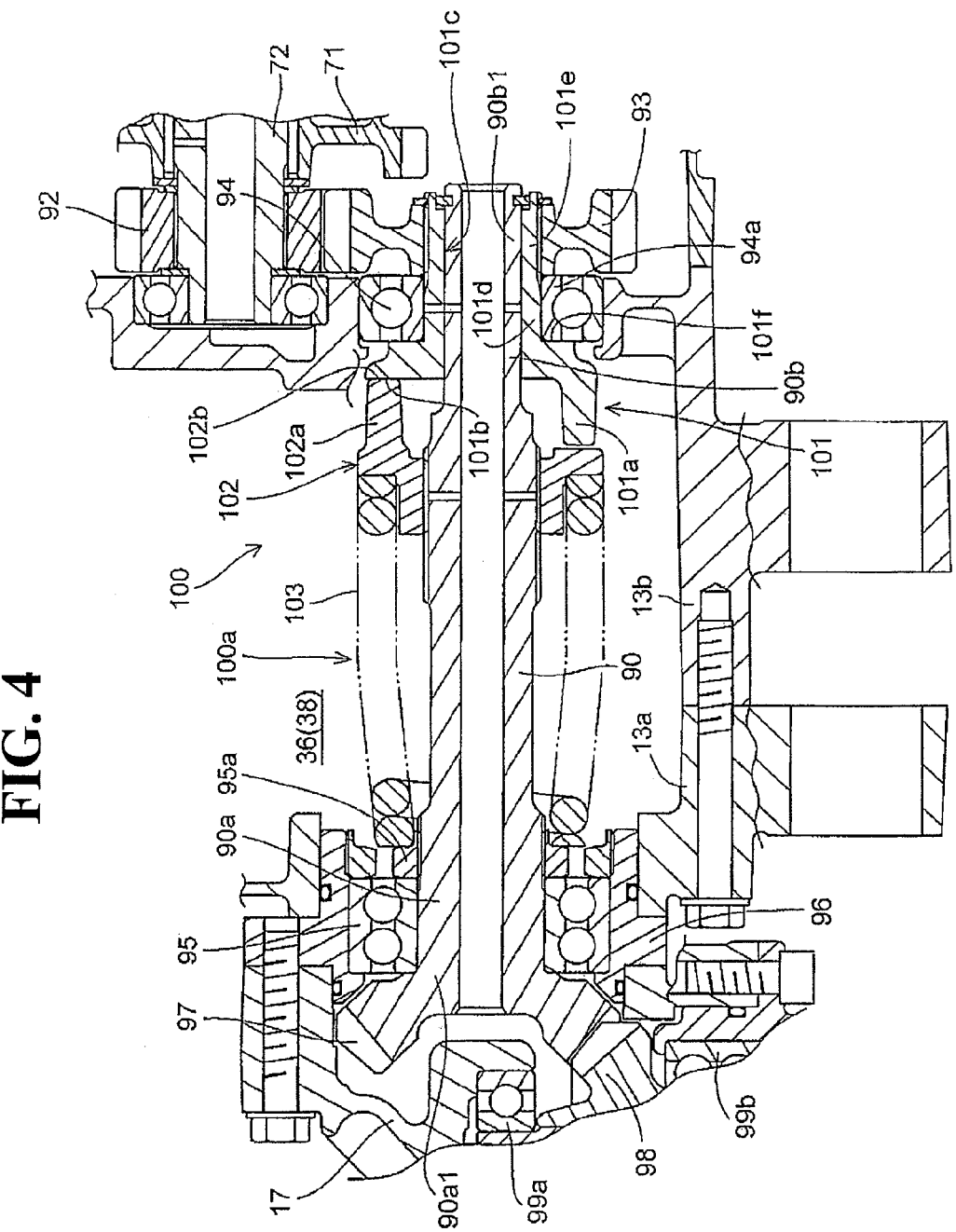
FIG. 4 is an enlarged view illustrating the vicinity of an output side torque damper of the power unit in FIG. 3.

Referring to FIGS. 3 and 4, the output mechanism To includes an intermediate shaft 90, which is a driven rotation shaft as a first power takeout shaft; a second power takeout shaft 91; a first transmission mechanism; a second transmission mechanism; and an output side torque damper 100. The intermediate shaft 90 is rotatably driven by the output shaft 72 as a drive rotating shaft. The second power takeout shaft 91 is rotatably driven by the intermediate shaft 90 to rotatably drive the drive shaft 142 (see FIG. 1). The first transmission mechanism is interposed between the output shaft 72 and the intermediate shaft 90 in the output side torque path to apply the torque of the output shaft 72 to the intermediate shaft 90. The second transmission mechanism is interposed between the intermediate shaft 90 and the power takeout shaft 91 in the output side torque transmission path to apply the torque of the intermediate shaft 90 to the power takeout shaft 91. The output side torque damper 100 is interposed between the transmission 60 and the power takeout shaft 91 in the output side torque transmission path to absorb excessive torque occurring in the output side torque transmission path.

The first transmission mechanism includes a drive gear 92 as a drive rotating body rotating integrally with the output shaft 72. A driven gear 93 as an input rotating body is meshed with the drive gear 92 to apply the torque of the output shaft 72 to the intermediate shaft 90. The driven gear 93 is spline-fitted to an input cam member 101 of a torque member 100 for integral rotation and connected to the intermediate shaft 90 via the torque damper 100.

The intermediate shaft 90 has a right shaft portion 90b that is rotatably journaled by the right case half body 13b via the input cam member 101 and via a bearing 94 and a left shaft portion 90a supported by the left case half body 13a via a bearing 95 and a bearing housing 96 joined to the left case half body 13a.

In the shaft portion 90b, the driven gear 93 is disposed via the input cam member 101 at a shaft-end portion 90b1 projecting rightward from the bearing 94. In the shaft portion 90a, a drive gear 97 is integrally formed with and disposed at a shaft-end portion 90a1 projecting leftward from the bearing 95.

The cam type torque damper 100 includes an input cam member 101 as an input member; an output cam member 102 as an output member; and a damper spring 103 as a biasing member. The input cam member 101 is rotatably carried by shaft portion 90b and is adapted to receive torque of the output shaft 72. The output cam member 102 is engaged with the input cam member 101 to transmit torque from the input cam member 101 to the intermediate shaft 90. The damper spring 103 axially biases the output cam member 102 to bring it into abutment against the input cam member 101. The damper spring 103 composed of a coil spring is interposed between a spring receiver 95a also serving as a member for fixing the bearing 95, and the output cam member 102.

Since the input cam member 101 is rotatably carried by the intermediate shaft 90, also the driven gear 93 is rotatably carried by the intermediate shaft 90.

In this way, the output shaft 72 as a first rotating shaft adapted to receive torque from the transmission output shaft 64 and the intermediate shaft 90 as a second rotating shaft adapted to receive torque from the output shaft 72 are arranged between the transmission output shaft 64 and the torque damper 100 in the output side transmission path. In the output side torque transmission path, a rotating shaft disposed between the transmission output shaft 64 and the intermediate shaft 90 provided with the torque damper 100 thereon is only the single output shaft 72.

The input cam member 101 of the torque damper 100 includes an input cam portion 101a formed with an input cam face 101b. A cylindrical support portion 101c axially extends along and is slidably carried by both the bearing 94 and the driven gear 93. The support portion 101c includes a holding portion 101d located axially adjacently to the input cam portion 101a to hold the bearing 94. An attachment portion 101e is located axially adjacent to the holding portion 101d and to which the driven gear 93 is attached by spline-fitting.

The bearing 94, one of a pair of the bearings 94, 95 rotatably supporting the intermediate shaft 90, is axially interposed between the input cam member 101a and the driven gear 93. The input cam portion 101a is such that an abutment surface 101f axially opposite to the input cam surface 101b is abutted against one side of an inner race 94a of the bearing 94. In addition, the driven gear 93 is abutted against the other side of the inner race 94a. In this way, the bearing 94 rotatably supporting the input cam member 101 and the intermediate shaft 90 via the input cam member 101 is axially positioned by the input cam member 101a and by the driven gear 93.

On the other hand, the output cam member 102 rotating integrally with the intermediate shaft 90 has an output cam portion 102a forming an output cam surface 102b is mounted to the intermediate shaft 90 through spline-fitting so as to be axially movable.

The input cam portion 101a, the output cam member 102 and the damper spring 103 are axially disposed between the pair of bearings 94, 95.

The torque damper 100 has a torque-absorbing portion 100a. The torque-absorbing portion 100a includes, between the pair of bearings, an input cam portion 101a which is an input damper portion of the input cam member 101. An output cam portion 102b is an output damper portion of the output cam member 102. A damper spring 103 is also included in the torque absorbing portion 100a. In the event that excessive torque exceeding a previously set second set torque is applied between the input cam member 101 and the output cam member 102, the torque absorbing-portion 100a absorbs the excessive torque.

The second set torque is set to a value greater than the first set torque of the input side torque damper 54. Therefore, the capacity of the torque damper 100 is greater than that of the torque damper 54.

Specifically, the input cam portion 101a and the output cam portion 102a are abutted at the cam surfaces 101b, 102b against each other by the biasing force of the damper spring 103 and can be circumferentially relatively slidable. When torque not greater than the second set torque is applied between both the cam members 101, 102, the torque damper 100 integrally rotates the input cam member 101 and the output cam member 102. During deceleration of the motorcycle V (see FIG. 1) or of the internal combustion engine E, e.g., during application of engine-braking to the motorcycle (see FIG. 1), when excessive torque exceeding the second set torque is applied, a rotation-directional slip occurs between the input cam member 101 and the output cam member 102. The output cam member 102 is driven by the input cam member 101 and is axially moved against the biasing force of the damper spring 103. At the same time, the input cam member 101 and the output cam member 102 are relatively rotated to absorb the excessive torque.

The second transmission mechanism includes the drive gear 97 composed of a bevel gear. The driven gear 98 is composed of a bevel gear meshed with the drive gear 97 and molded integrally with the power takeout shaft 91.

The power takeout shaft 91 is disposed inside the gear cover 17 joined to the left case half body 13a and is rotatably supported via the pair of bearings 99a, 99b. A rotational position sensor 19 for detecting the rotational position of the driven gear 98 is provided on the gear cover 17 and detects vehicle speed based on the detection signal of the sensor 19.

With reference to FIGS. 2 and 3, the left case half body 13a, the left cover 14, and the gear cover 17 (the whole of "the left case half body 13a, the left cover 14, and the gear cover 17" is hereinafter called "the side cover" as needed) constitute one lateral wall of the power unit P in the vehicle-width direction (also the axial direction of the crankshaft 33). A large portion of the side cover is covered by an exterior cover C1 from the left side as a predetermined direction and on the outside of the power unit P. In addition, a large portion of the right case half body 13b and the right cover 16 constituting another lateral wall of the power unit P in the vehicle-width direction is covered by an exterior cover C2 from the right side, which is the outside of the power unit P. Both the exterior covers C1, C2 formed of a synthetic resin are sound insulation covers as cover members, which improve the external appearance of the power unit P and reduce radiated sound produced by the power unit P.

The exterior cover C1 is secured to attachment seats 112 (an attachment seat 112 provided on the left case half body 13a is shown in FIG. 3), provided on the left case half body 13a, the left cover 14, and the gear cover 17, in a plurality of, three, respective attachment portions 111 with bolts 110. The exterior cover C1 covers from left the general whole of the left cover 14 excluding the lower edge portion of the left cover 14, and the whole of the gear cover 17.

A space S is defined between the side cover and the exterior cover C1 disposed to form an interval in a left to right direction.

A sound-absorbing material 115 made of a foam material (e.g. urethane foam) is arranged along the internal surface, facing the space S, of the exterior cover C1 so as to reduce radiated sound.

A resonator 120 resonating with the specific frequency of radiated sound is disposed between the sound-absorbing material 115 and the side cover in the space S. The resonator 120 communicates with the space S through an opening 127 defined by a neck 126.

A description will now be given of the operation and effects of the embodiment described as above.

The motorcycle V includes the internal combustion engine E provided with the crankshaft 33. The hydrostatic continuously variable transmission 60 is rotatably driven by torque of the crankshaft 33. The rear wheel 7 is rotatably driven by torque from the transmission 60. The torque dampers 54, 100 are adapted to absorb excessive torque occurring in the torque transmission path from the crankshaft 33 to the rear wheel 7. In the motorcycle V, the torque transmission path is composed of the input side torque transmission path between the crankshaft 33 and the transmission 60 and the output side torque transmission path between the transmission 60 and the rear wheel 7, with the transmission 60 interposed therebetween. The torque dampers 54, 100 include the input side torque damper 54 disposed in the input side torque transmission path and the output side torque damper 100 disposed in the output side torque transmission path. With such a configuration, excessive torque occurring in the torque transmission path from the crankshaft 33 through the transmission 60 to the rear wheel 7 is absorbed by the output side torque damper 100 and then applied to the transmission 60. Thus, excessive torque applied to the transmission 60, excessive torque occurring in the input side torque transmission path, and vibrations caused when the transmission 60 and the crankshaft 33 resonate with each other are reduced. Consequently, a torque shock caused by rotary inertia of the hydrostatic continuously variable transmission 60 with rotary inertia large because of the provision of the clutch 65, the hydraulic pump 61 having the rotating pump housing 61a, and the hydraulic motor 62, and vibrations caused by the resonance between the transmission 60 and the crankshaft 33 are reduced to improve ride quality of the motorcycle V.

The output side torque transmission path includes the output side transmission mechanism T including the output shaft 72 of the running clutch 70 adapted to receive torque from the transmission output shaft 64 of the transmission 60 and the intermediate shaft 90 adapted to receive torque from the output shaft 72. The terminal transmission mechanism 140 is adapted to receive torque from the output side transmission mechanism T and drive the rear wheel 7. In the output side torque transmission mechanism, the rotating shaft disposed between the transmission output shaft 64 and the intermediate shaft 90 is only the single output shaft 72 and the output side torque damper 100 is mounted to the intermediate shaft 90. The rotating shaft to which excessive torque reduced by the output side torque damper 100 is applied between the transmission 60 and the intermediate shaft 90 is only the single output shaft 72 in the output side torque transmission path. Thus, the rotary inertia of the rotating shaft disposed between the output side torque damper 100 and the transmission 60 can be reduced. Consequently, a torque shock caused by the excessive torque in the input side torque transmission path can be reduced and additionally the input side torque damper 54 can be reduced in capacity and thus reduced in size.

The capacity of the output side torque damper 100 is greater than that of the input side torque damper 54. The excessive torque in the output side transmission path is largely absorbed by the output side torque damper 100. Thus, the torque shock caused by the rotary inertia of the transmission 60 can significantly be reduced. As a result, the torque shock can further be reduced. In addition, since the capacity of the input side torque damper 54 is small, the input side torque damper 54 can be downsized.

In the output side transmission mechanism T of the power unit P, the torque damper 100 for absorbing excessive torque occurring in the output side transmission path between the output shaft 72 of the running clutch 70 and the intermediate shaft 90 includes the input cam member 101 adapted to receive the torque of the output shaft 72 and the output cam member 102 adapted to transmit torque from the input cam member 101 to the intermediate shaft 90. In addition, the input shaft member 101 and the output shaft member 102 are relatively rotated to absorb the excessive torque. The output shaft 72 is rotatably supported by the pair of bearings 94, 95. The driven gear 93 is mounted to the input cam member 101 rotatably supported by the intermediate shaft 90 to apply the torque of the output shaft 72 to the input cam member 101. The output cam member 102 is rotated integrally with the intermediate shaft 90. In the torque damper 100, the torque-absorbing portion 100a for absorbing excessive torque includes the input cam portion 101a of the input cam member 101 and the output cam portion 102a of the output cam member 102 and is disposed between the pair of bearings 94, 95 in the axial direction of the intermediate shaft 90. The bearing 94 is disposed between the input cam portion 101a and the driven gear 93 in the axial direction.

With this configuration, in the torque damper 100 mounted to the intermediate shaft 90 rotatably supported by the pair of bearings 94, 95, the torque-absorbing portion 100a for absorbing excessive torque and the driven gear 93 are dividedly arranged on both sides of the bearing 94 in the axial direction. The length of the intermediate shaft 90 is reduced between the pair of the bearings 94, 95. Thus, the bending deformation of the intermediate shaft 90 can be suppressed. In addition, the total length of the intermediate shaft 90 can be reduced compared with the case where a torque damper is disposed outside of the pair of bearings 94, 95 in the axial direction. As a result, the intermediate shaft 90 to which the torque damper 100 is mounted can be downsized in the axial direction and reduced in weight, and in turn the power unit P can be downsized in the axial direction of the intermediate shaft 90.

The output cam member 102 is axially movably supported by the intermediate shaft 90. The input cam portion 101a has the input cam surface 101b and the output cam portion 102a has the output cam surface 102b abutted against the input cam surface 101b. The bearing 94 is axially positioned by the input cam portion 101a and by the driven gear 93. The bearing 94 of the pair of bearings 94, 95 rotatably supporting the intermediate shaft 90 is positioned by use of the input cam portion 101a and the driven gear 93. Thus, a dedicated portion or member used to position the bearing 94 becomes unnecessary, thereby reducing costs.

The bearing 94 rotatably supports the intermediate shaft 90 via the input cam member 101 of the torque damper 100. Therefore, the diameter of the bearing 94 can be increased. Consequently, the capacity of the bearing 94, i.e., the load capability of the bearing 94, can be increased to improve durability of the bearing 94.

A description is hereinafter given of a partially modified mode of the embodiment described above focusing on the modified portion.

The torque damper may be a spring type torque damper in which a damper spring is circumferentially disposed between an input member and an output member.

The power unit P for driving a drive target is not necessarily a unit integrally composed of the internal combustion engine E and the transmission apparatus like the embodiment described above. The power unit P may be composed of only the internal combustion engine or the transmission apparatus or of an engine other than an internal combustion engine.

The internal combustion engine may be a multi-cylinder engine other than a V-type 2-cylinder engine, or may be a single-cylinder internal combustion engine. In addition, the transmission may be a hydrostatic continuously transmission other than a swash plate type transmission.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle comprising:
an internal combustion engine provided with a crankshaft;
a hydrostatic continuously variable transmission rotatably driven by torque of the crankshaft;
a drive wheel rotatably driven by torque from the transmission; and
a torque damper for absorbing excessive torque occurring in a torque transmission path from the crankshaft to the drive wheel,
wherein the torque transmission path is composed of an input side transmission path between the crankshaft and the transmission and an output side torque transmission path between the transmission and the drive wheel, with the transmission interposed therebetween, and the torque damper includes an input side torque damper disposed on the crankshaft and in the input side torque transmission path and an output side torque damper disposed in the output side torque transmission path, and an input side torque damper spring of the input side torque damper is composed of a plurality of disc springs,
wherein the output side torque transmission path includes a transmission mechanism including a first rotating shaft adapted to receive torque from a transmission output shaft of the transmission and a second rotating shaft adapted to receive torque from the first rotating shaft, and a terminal transmission mechanism adapted to receive torque from the transmission mechanism for driving the drive wheel,
wherein, in the output side torque transmission path, a rotating shaft disposed between the transmission output shaft and the second rotating shaft is only the single first rotating shaft,
wherein the output side torque damper is mounted to the second rotating shaft,
wherein the output side torque damper includes:
an input cam member;
an output cam member; and
an output side torque damper spring,
wherein the input cam member is rotatably carried by a shaft portion and is adapted to receive torque of an output shaft of the transmission, and the output cam member is engaged with the input cam member to transmit torque from the input cam member to an intermediate shaft, and the output side torque damper spring axially biases the output cam member to bring it into abutment against the input cam member,
wherein the output side torque damper spring is composed of a coil spring and is interposed between a spring receiver and the output cam member, and
wherein the output side torque damper has capacity greater than that of the input side torque damper.

2. A torque damper for absorbing excessive torque occurring in a torque transmission path from a crankshaft to a drive wheel of a vehicle, wherein the torque transmission path is composed of an input side transmission path between the crankshaft and a transmission and an output side torque transmission path between the transmission and the drive wheel, with the transmission interposed therebetween, said torque damper comprising:
an input side torque damper disposed on the crankshaft and in the input side torque transmission path and an output side torque damper disposed in the output side torque transmission path, and an input side torque damper spring of the input side torque damper is composed of a plurality of disc springs,
wherein the output side torque transmission path includes a transmission mechanism including a first rotating shaft adapted to receive torque from a transmission output shaft of the transmission and a second rotating shaft adapted to receive torque from the first rotating shaft, and a terminal transmission mechanism adapted to receive torque from the transmission mechanism for driving the drive wheel,
wherein, in the output side torque transmission path, a rotating shaft disposed between the transmission output shaft and the second rotating shaft is only the single first rotating shaft,
wherein the output side torque damper is mounted to the second rotating shaft, wherein the output side torque damper includes:
- an input cam member;
- an output cam member; and
- an output side torque damper spring, wherein the input cam member is rotatably carried by a shaft portion and is adapted to receive torque of an output shaft of the transmission, and the output cam member is engaged with the input cam member to transmit torque from the input cam member to an intermediate shaft, and the output side torque damper spring axially biases the output cam member to bring it into abutment against the input cam member, wherein the output side torque damper spring is composed of a coil spring and is interposed between a spring receiver and the output cam member, and wherein the output side torque damper has capacity greater than that of the input side torque damper.

* * * * *